Patented Dec. 14, 1943

2,336,983

UNITED STATES PATENT OFFICE 2,336,983

PRINTING INK

Donald Robert Erickson and Paul J. Thoma, Kalamazoo, Mich., assignors to Michigan Research Laboratories, Inc., Kalamazoo, Mich.

No Drawing. Application June 2, 1941, Serial No. 396,298

1 Claim. (Cl. 106—30)

This invention relates to improvements in printing ink.

This invention relates to printing inks and particularly to those in which a binder is employed with a solvent, the binder being soluble in the solvent and in the solvent with a limited quantity of water but not soluble in the solvent with an unlimited quantity of water. Such inks are desirable because they will withstand high press room humidities and will not set up on the rolls or plates, but may be used in connection with the application of water to prevent offset. When more than a limited quantity of water is added to the printed film in any suitable way, such as exposing the printed film to steam or water sprays, the binder at the surface of the printed film separates from the solvent to prevent offset.

The objects of this invention are:

First, to provide a new and improved printing ink of the type described.

Second, to provide such a printing ink which has highly desirable water tolerance, making it capable of resisting very high press room humidities.

Third, to provide such an ink which has very desirable properties with reference to tack in that it has a very low tack compared to other inks of this type.

Fourth, to provide such an ink which can be made inexpensively.

Other objects and advantages pertaining to details will appear from the description to follow.

We have found that if in an ink of the class described we use as a solvent liquid polyglycols such as diethylene glycol and if we use as a binder a resin comprising a rosin modified with an alpha beta unsaturated organic polybasic acid such as maleic or fumaric, or a resin comprising a terpene hydrocarbon of the formula $C_{10}H_{16}$ such as alpha terpinene, beta terpinene, pinene, alpha pinene, beta pinene, dipentene, limonene, or terpinolene, modified with such an acid, or a mixture of these resins with a small amount of a higher solid waxy fatty alcohol such as cetyl alcohol [$C_{16}H_{33}OH$], lauryl alcohol [$C_{12}H_{25}OH$], stearyl alcohol [$C_{18}H_{37}OH$], oleyl alcohol [$C_{18}H_{35}OH$], or myristyl alcohol [$C_{14}H_{29}OH$], the ink will have the desired properties. It will have a water tolerance greater than that of such an ink without the alcohol added and it will have considerably less tack.

We have found that from ¼ to 2% by weight of the varnish used in the ink of the alcohol or a mixture of the alcohols may be used. The amount to be used depends upon the desired water tolerance and the tack. In certain inks more tack is desired than in others and when it is desired to cut down on the amount of tack more of the alcohol is added. The addition of larger amounts of alcohol results in a greater water tolerance.

Typical examples of our ink are made with the following varnishes and a suitable amount of pigment.

Parts
1. A resin comprising a rosin modified by an alpha beta unsaturated organic polybasic acid_____ 50
   Diethylene glycol_____ 50
   Cetyl alcohol_____ 1
2. A resin comprising a rosin modified by an alpha beta unsaturated organic polybasic acid _____ 50
   Diethylene glycol_____ 50
   Stearyl alcohol _____ 1
3. A terpene hydrocarbon of the formula $C_{10}H_{16}$_____ 50
   Diethylene glycol_____ 50
   Cetyl alcohol_____ 1

The amount of higher fatty alcohols can vary. We have found that from ¼ to 5%, depending upon the tack desired in the finished ink and on the water tolerance desired, will give satisfactory results. Other solid higher fatty alcohols than those specifically mentioned by way of example can be used with satisfactory results.

The resin comprising a rosin modified with an alpha beta unsaturated organic polybasic acid may be purchased in the open market under the trade name "Teglac 127." The terpene hydrocarbon having the formula $C_{10}H_{16}$ modified with an alpha beta unsaturated organic polybasic acid may be obtained under the trade name "Petrex Acid."

We have found that a combination of higher fatty alcohols sold under the trade name "Lannette Wax" is highly satisfactory for use in practicing our invention.

Some of the "Teglac 127" or the "Petrex Acid" may be replaced in amounts up to 20% with phenolic resin, gum rosin, wood rosin, alkyd resin, urea, or melamine formaldehyde condensation products, or shellac. These products tend to reduce the water tolerance of the ink but the alcohol helps to overcome this tendency so that the ink will stay open on the press.

20% of a varnish consisting of 80% of diethylene glycol and 20% of zein may be used or 20% of such a varnish consisting of 65% diethylene glycol and 35% zein modified either by an alpha beta unsaturated organic polybasic acid such as maleic or fumaric, or with a hydroxy organic acid such as malic, citric, tartaric, lactic, or gluconic, may be used. These zein varnishes tend to reduce the water tolerance, but the alcohol helps overcome this to keep the ink open on the press.

The terms and expressions which have been herein employed are used as terms of description and not of limitation and there is no intention in the use of such terms and expressions of excluding any equivalents of the features shown and described. It is recognized that various modifications are possible within the scope of the invention claimed.

Having thus described our invention, what we claim as new and desire to secure by Letters Patent is:

A non-offsetting printing ink comprising a varnish made up of a liquid polyglycol as a solvent and a resin selected from the group consisting of rosin modified by an alpha beta unsaturated organic polybasic acid and a terpene hydrocarbon having the formula $C_{10}H_{16}$ modified by an alpha beta unsaturated organic polybasic acid, in sufficient amount to form when subjected to steam, immediately after printing, a thin hard film of resin over the exposed surface of the printed film, and from ¼% to 5% of the weight of the varnish of a higher fatty monohydric solid wax-like alcohol selected from the group consisting of cetyl alcohol, lauryl alcohol, stearyl alcohol, oleyl alcohol, myristyl alcohol, and a pigment.

DONALD ROBERT ERICKSON.
PAUL J. THOMA.